US012714284B2

(12) United States Patent
Kim et al.

(10) Patent No.: US 12,714,284 B2
(45) Date of Patent: Aug. 25, 2026

(54) ROBOT LINKED TO DISHWASHER, AND METHOD FOR CONTROLLING SAME

(71) Applicant: SAMSUNG ELECTRONICS CO., LTD., Suwon-si (KR)

(72) Inventors: Duckhwan Kim, Suwon-si (KR); Woojong Yoo, Suwon-si (KR); Junesuk Lee, Suwon-si (KR); Kuyoung Choi, Suwon-si (KR); Changsu Ha, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 15 days.

(21) Appl. No.: 19/052,996

(22) Filed: Feb. 13, 2025

(65) Prior Publication Data

US 2025/0176794 A1 Jun. 5, 2025

Related U.S. Application Data

(63) Continuation of application No. PCT/KR2023/010964, filed on Jul. 27, 2023.

(30) Foreign Application Priority Data

Sep. 7, 2022 (KR) ........................ 10-2022-0113756

(51) Int. Cl.

*A47L 15/42* (2006.01)
*A47L 15/00* (2006.01)
*B25J 9/16* (2006.01)

(52) U.S. Cl.

CPC ....... *A47L 15/4295* (2013.01); *A47L 15/0063* (2013.01); *B25J 9/1689* (2013.01);
(Continued)

(58) Field of Classification Search

CPC ............. A47L 15/4295; A47L 15/0063; A47L 2401/04; A47L 2501/36; A47L 2501/30;
(Continued)

(56) References Cited

U.S. PATENT DOCUMENTS 5,904,163 A 5/1999 Inoue et al.
7,107,123 B2 * 9/2006 Watanabe ................ B65B 5/12 141/168

(Continued)

FOREIGN PATENT DOCUMENTS

CN 113818774 A 12/2021
JP 2019 17611 A 2/2019

(Continued)

OTHER PUBLICATIONS

Communication dated May 12, 2025 issued by the European Patent Office in European Patent Application No. 23863346.5.

(Continued)

*Primary Examiner* — Bhavesh V Amin
(74) *Attorney, Agent, or Firm* — Sughrue Mion, PLLC

(57) ABSTRACT

Provided is a robot linked to a dishwasher and a method of controlling same. The robot includes: a camera; a manipulator including a gripper; a communication interface; memory storing instructions; and a processor configured to execute the instructions and cause the robot to: obtain an image including dishes, obtain, based on the image, information about a number of the dishes, a type of each of the dishes, and a size of each of the dishes, control the manipulator to grip each of the dishes using the gripper based on at least one of the type of each of the dishes or the size of each of the dishes, determine washing information of an external dishwasher for the dishes based on the number of dishes, the
(Continued)

type of each of the dishes, and the size of each of the dishes, and transmit the washing information to the external dishwasher.

20 Claims, 8 Drawing Sheets

(52) U.S. Cl.
CPC ......... *B25J 9/1697* (2013.01); *A47L 2401/04* (2013.01); *A47L 2501/36* (2013.01)

(58) Field of Classification Search
CPC ...... A47L 15/0021; A47L 15/00; A47L 15/50; B25J 9/1689; B25J 9/1697; B25J 9/1612; B25J 19/021; B25J 9/1679; B25J 11/00; B25J 11/008; B25J 13/00; B25J 13/08; B25J 19/02; B25J 9/1664; B25J 13/006; B25J 19/023; G05B 2219/39543; G05B 2219/40564; G05B 2219/40584; G05B 2219/40607; G06T 7/62; G06T 7/70; G06V 10/20
See application file for complete search history.

(56) References Cited

U.S. PATENT DOCUMENTS 7,174,830 B1 * 2/2007 Dong ..................... B25J 9/0087 99/348
7,673,916 B2 * 3/2010 Greenhill ............. B25J 15/0009 901/39
7,844,398 B2 * 11/2010 Sato ....................... B25J 9/1666 700/214
9,815,191 B2 * 11/2017 Oleynik ................ A47J 36/321
10,835,098 B2 11/2020 Disch et al.
11,190,374 B2 11/2021 Shribman et al.
11,696,661 B2 * 7/2023 Itano .................... B25J 11/0045 99/325
2004/0172380 A1 * 9/2004 Zhang .................... B25J 9/1682
2005/0193901 A1 * 9/2005 Buehler .................... A23L 5/10 99/468
2007/0018470 A1 * 1/2007 Hayakawa ............. B25J 13/085 294/902
2007/0120512 A1 * 5/2007 Albu-Schaffer ....... B25J 9/1643 318/568.2
2009/0031825 A1 * 2/2009 Kishida ................... G01L 5/228 73/862.621
2009/0158864 A1 * 6/2009 Hayakawa ............. B25J 13/084 901/1
2009/0210090 A1 * 8/2009 Takemitsu ............. B25J 9/1661 901/1
2009/0285664 A1 * 11/2009 Kim ....................... B25J 9/1612 414/730
2010/0010703 A1 * 1/2010 Coats ..................... G05D 1/024 701/1
2010/0043834 A1 2/2010 Scheringer
2011/0208355 A1 * 8/2011 Tsusaka ................... B25J 13/08 901/31
2013/0331989 A1 * 12/2013 Umeno .................. G06N 3/008 700/258
2015/0290795 A1 * 10/2015 Oleynik ................. G05B 19/42 700/257
2018/0029222 A1 * 2/2018 Oleynik ................ A47J 36/321
2018/0043526 A1 * 2/2018 Oleynik ................. B25J 9/0081
2018/0147718 A1 * 5/2018 Oleynik ................. B25J 9/0081
2018/0257219 A1 * 9/2018 Oleynik ................ A47J 36/321
2019/0381654 A1 * 12/2019 Oleynik ................ A47J 36/321
2020/0085275 A1 3/2020 Lee
2021/0093150 A1 4/2021 Shin et al.
2021/0321813 A1 10/2021 Shiraki
2022/0183531 A1 6/2022 Shin et al.
2025/0176794 A1 * 6/2025 Kim .................... A47L 15/4295
2025/0282046 A1 * 9/2025 Oleynik ................. G05B 19/42

FOREIGN PATENT DOCUMENTS

JP 2019-17612 A 2/2019
JP 6895609 B2 6/2021
JP 2021-121306 A 8/2021
JP 2022-33056 A 2/2022
JP 7018637 B2 2/2022
JP 2022-111620 A 8/2022
KR 10-2019-0107620 A 9/2019
KR 10-2021-0039026 A 4/2021
KR 10-2021-0088327 A 7/2021
KR 10-2391425 B1 4/2022

OTHER PUBLICATIONS

Tech Trends Shameer, “Automatic Door Opening Using IR Sensor | Arduino Projects”, Aug. 12, 2021, XP 093274311, https://www.youtube.com/watch?v=HulppQPLuPs (2 pages total).
International Search Report (PCT/ISA/210) and Written Opinion (PCT/ISA/237) issued Nov. 1, 2023 by the International Searching Authority in International Patent Application No. PCT/KR2023/010964.
Communication dated Oct. 8, 2025, issued by European Patent Office in European Patent Application No. 23863346.5.

* cited by examiner

ROBOT LINKED TO DISHWASHER, AND METHOD FOR CONTROLLING SAME

CROSS-REFERENCE TO RELATED APPLICATIONS

This application is a by-pass continuation of International Application No. PCT/KR2023/010964, filed on Jul. 27, 2023, which is based on and claims priority to Korean Patent Application No. 10-2022-0113756, filed in the Korean Intellectual Property Office on Sep. 7, 2022, the disclosures of which are incorporated by reference herein in their entireties.

BACKGROUND

1. Field

The present disclosure relates to a robot linked to a dishwasher, and a method for controlling the same, and more particularly, the present disclosure relates to a robot that obtains information about dishes and determines washing information of the dishwasher for the dishes based on the obtained information, and a method for controlling the same.

2. Description of Related Art

Robots are used in various industrial fields in accordance with the development of electronic technology. Robots may accurately distinguish various objects due to advancements in object recognition technology, and robots may be driven stably without interfering with a passage of people in a driving space with the development of autonomous driving technology.

However, robots still perform limited functions despite their use in various industrial fields. For example, most robots still only perform functions such as moving a heavy object or serving food. This limitation is especially evident in a domestic robot. The reason is that most of the domestic robots currently used in homes are limited to robot vacuum cleaners.

Therefore, a method for using the robot more usefully is required together with the development of robot technology. In particular, a user's convenience may be further increased if the robot is capable of being used more actively in the kitchen, where most housework is performed.

SUMMARY

Provided are a robot linked to a dishwasher and a method for controlling the same.

According to an aspect of the disclosure, a robot includes: at least one camera; a manipulator including a gripper; a communication interface; memory storing one or more instructions; and at least one processor configured to execute the one or more instructions, wherein the one or more instructions, when executed by the at least one processor, cause the robot to: obtain an image including one or more dishes through the at least one camera, obtain, based on the image, information about a number of the one or more dishes, information about a type of each of the one or more dishes, and information about a size of each of the one or more dishes, control the manipulator to grip each of the one or more dishes using the gripper based on at least one of the information about the type of each of the one or more dishes or the information about the size of each of the one or more dishes, determine washing information of an external dishwasher for the one or more dishes based on the information about the number of the one or more dishes, the information about the type of each of the one or more dishes, and the information about the size of each of the one or more dishes, and transmit the washing information to the external dishwasher through the communication interface.

The at least one camera may include a first camera and a second camera, and the one or more instructions, when executed by the at least one processor, may cause the robot to: obtain a first image including the one or more dishes through the first camera, identify the number of the one or more dishes and the type of each of the one or more dishes based on the first image, control the manipulator to grip each of the one or more dishes using the gripper based on the type of each of the one or more dishes, obtain one or more second images of the respective one or more dishes through the second camera while gripping each of the one or more dishes using the gripper, and identify the size of each of the one or more dishes based on the one or more second images.

The one or more instructions, when executed by the at least one processor, may cause the robot to: determine an arrangement order of the one or more dishes based on the information about the type of each of the one or more dishes, and control the manipulator to place the one or more dishes in the external dishwasher based on the arrangement order.

The one or more instructions, when executed by the at least one processor, may cause the robot to, based on the one or more dishes corresponding to a first type, determine the arrangement order of the one or more dishes based on the information about the size of each of the one or more dishes.

The one or more instructions, when executed by the at least one processor, may cause the robot to: identify an arrangement position of each of the one or more dishes in the external dishwasher based on the information about the type of each of the one or more dishes and the information about the size of each of the one or more dishes, and control the manipulator to place each of the one or more dishes at the arrangement position of each of the one or more dishes.

The one or more instructions, when executed by the at least one processor, cause the robot to: determine a washing time of the external dishwasher for the one or more dishes based on the information about the number of the one or more dishes, and transmit the washing time as the washing information for the one or more dishes to the external dishwasher through the communication interface.

The one or more instructions, when executed by the at least one processor, may cause the robot to: based on the one or more dishes including a plurality of dishes and based on the number of the plurality of dishes being greater than or equal to a predetermined number, classify the plurality of dishes into a first wash group and a second wash group based on the information about the type of each of the one or more dishes and the information about the size of each of the one or more dishes, identify a number of dishes in each of the first wash group and the second wash group, and determine a washing order of the first wash group and the second wash group based on the number of dishes in the first wash group and the number of dishes in the second wash group.

The one or more instructions, when executed by the at least one processor, may cause the robot to: determine an operation speed of the external dishwasher based on the information about the number of the one or more dishes, and transmit the operation speed as the washing information for the one or more dishes to the external dishwasher through the communication interface.

The robot may further include a sensor, and the one or more instructions, when executed by the at least one processor, may cause the robot to, based on obtaining sensing information through the sensor indicating that a distance between the robot and the external dishwasher is less than a predetermined distance, transmit, through the communication interface, a signal requesting to open a door of the external dishwasher.

According to an aspect of the disclosure, a method of controlling a robot includes: obtaining an image including one or more dishes through at least one camera of the robot; obtaining, based on the image, information about a number of the one or more dishes, information about a type of each of the one or more dishes, and information about a size of each of the one or more dishes, controlling a manipulator of the robot to grip each of the one or more dishes using a gripper based on at least one of the information about the type of each of the one or more dishes or the information about the size of each of the one or more dishes; determining washing information of an external dishwasher for the one or more dishes based on the information about the number of the one or more dishes, the information about the type of each of the one or more dishes, and the information about the size of each of the one or more dishes; and transmitting the washing information to the external dishwasher through a communication interface of the robot.

The obtaining the image may include obtaining a first image including the one or more dishes through a first camera of the robot, and the obtaining the information about the number of the one or more dishes, the information about the type of each of the one or more dishes, and the information about the size of each of the one or more dishes may include: identifying the number of the one or more dishes and the type of each of the one or more dishes based on the first image; controlling the manipulator to grip each of the one or more dishes using the gripper based on the type of each of the one or more dishes; obtaining one or more second images of the respective one or more dishes through a second camera of the robot while gripping each of the one or more dishes using the gripper; and identifying the size of each of the one or more dishes based on the one or more second images.

The method may further include: determining an arrangement order of the one or more dishes based on the information about the type of each of the one or more dishes; and controlling the manipulator to place the one or more dishes in the external dishwasher based on the arrangement order.

The determining the arrangement order may include, based on the one or more dishes corresponding to a first type, determining the arrangement order of the one or more dishes based on the information about the size of each of the one or more dishes.

The controlling the manipulator to place the one or more dishes in the external dishwasher may further include: identifying an arrangement position of each of the one or more dishes in the external dishwasher based on the information about the type of each of the one or more dishes and the information about the size of each of the one or more dishes, and controlling the manipulator to place each of the one or more dishes at the arrangement position of each of the one or more dishes.

According to an aspect of the disclosure, a non-transitory computer readable medium has instructions stored therein, which when executed by at least one processor cause the at least one processor to execute a method of controlling a robot, the method including: obtaining an image including one or more dishes through at least one camera of the robot; obtaining, based on the image, information about a number of the one or more dishes, information about a type of each of the one or more dishes, and information about a size of each of the one or more dishes, controlling a manipulator of the robot to grip each of the one or more dishes using a gripper of the robot based on at least one of the information about the type of each of the one or more dishes or the information about the size of each of the one or more dishes; determining washing information of an external dishwasher for the one or more dishes based on the information about the number of the one or more dishes, the information about the type of each of the one or more dishes, and the information about the size of each of the one or more dishes; and transmitting the washing information to the external dishwasher through a communication interface of the robot.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
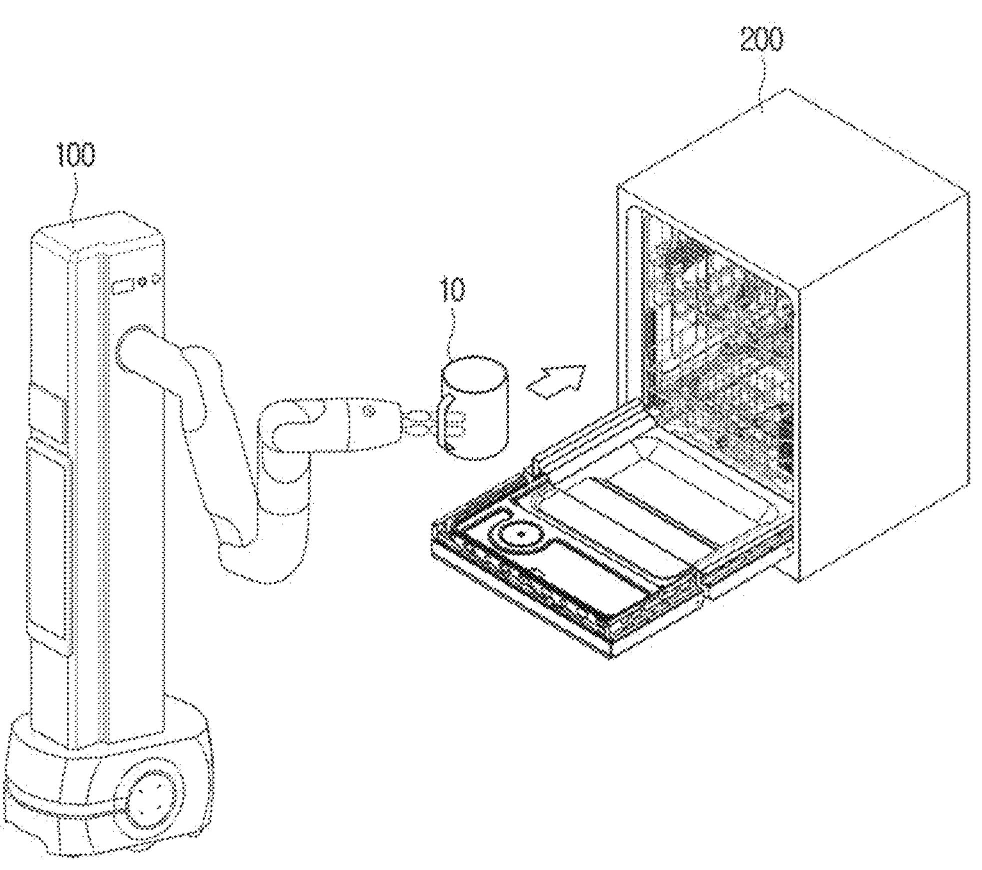
FIG. 1 is an example diagram of a robot according to one or more embodiments of the present disclosure.

The present disclosure may be variously modified and have multiple embodiments, and specific embodiments of the present disclosure are thus shown in the drawings and described in detail in the detailed description. However, it should be understood that the scope of the present disclosure is not limited to the specific embodiments, and includes various modifications, equivalents, and/or alternatives according to the embodiments of the present disclosure. Throughout the accompanying drawings, similar components are denoted by similar reference numerals.

In addition, the following embodiments may be modified in different forms, and the scope and spirit of the present disclosure are not limited to the following embodiments. Rather, these embodiments are provided to make the present disclosure thorough and complete, and completely convey the spirit of the present disclosure to those skilled in the art.

Terms used in the present disclosure are used only to describe the specific embodiments rather than limiting the scope of the present disclosure. Here, a term of a singular number includes its plural number unless explicitly interpreted otherwise in the context.

In the present disclosure, an expression "have", "may have", "include", "may include" or the like, indicates the presence of a corresponding feature (for example, a numerical value, a function, an operation, or a component such as a part), and does not exclude the presence of an additional feature.

In the present disclosure, the expressions "A or B", "at least one of A and/or B", "one or more of A and/or B", or the like, may include all possible combinations of items enumerated together. For example, "A or B", "at least one of A and B" or "at least one of A or B" may indicates all of 1) a case where at least one A is included, 2) a case where at least one B is included, or 3) a case where both of at least one A and at least one B are included.

The expressions "first", "second", and the like, used in the present disclosure may indicate various components regardless of a sequence and/or importance of the components. These expressions are only used in order to distinguish one component and another component from each other, and do not limit the corresponding components.

If any component (for example, a first component) is mentioned to be "(operatively or communicatively) coupled with/to" or "connected to" another component (for example, a second component), it should be understood that the any component is directly coupled to another component or may be coupled to another component through still another component (for example, a third component).

On the other hand, if any component (for example, the first component) is mentioned to be "directly coupled" or "directly connected to" another component (for example, the second component), it should understood that still another component (for example, the third component) is not present between any component and another component.

An expression "configured (or set) to" used in the present disclosure may be replaced with an expression "suitable for", "having the capacity to", "designed to", "adapted to", "made to", or "capable of" based on a situation. The expression "configured (or set) to" may not necessarily indicate "specifically designed to" in hardware.

Rather, an expression "a device configured to" in some contexts may indicate that the device may "perform~" together with another device or component. For example, "a processor configured (or set) to perform A, B and C" may indicate a dedicated processor (for example, an embedded processor) that performs a corresponding operation or a generic-purpose processor (for example, a central processing unit (CPU) or an application processor) that performs the corresponding operation by executing at least one software program stored in a memory device.

In the embodiments, a "module" or a "~er/or" may perform at least one function or operation, and be implemented by hardware, software, or a combination of hardware and software. In addition, a plurality of "modules" or a plurality of "~ers/ors" may be integrated with each other in at least one module and implemented by at least one processor except for a "module" or an "~er/or" that needs to be implemented in specific hardware.

The various elements and regions in the drawings are schematically shown. Therefore, the spirit of the present disclosure is not limited to relative sizes or intervals shown in the accompanying drawings.

Hereinafter, the embodiments of the present disclosure are described in detail with reference to the accompanying drawings so that those skilled in the art to which the present disclosure pertains may practice the present disclosure.

FIG. 1 is an example diagram of a robot according to one or more embodiments of the present disclosure.

Referring to FIG. 1, a robot 100 may be linked to an external dishwasher 200 and perform a function according to one or more embodiments of the present disclosure. In more detail, the robot 100 may obtain a plurality of dishes that require washing and then obtain information about the obtained plurality of dishes.

Here, the plurality of dishes that require washing may be obtained at a predetermined place or location. As an example, the robot 100 may obtain the plurality of dishes placed on a tray return station in a restaurant, a tray return counter, or the like. Here, if a tray including the plurality of dishes is placed on the tray return counter or the tray return station, the robot 100 may obtain the plurality of dishes included in the tray. Alternatively, the robot 100 may obtain the plurality of dishes placed on a table in a home or restaurant. Here, the robot 100 may obtain the plurality of dishes placed on the table if the robot 100 receives a user command requesting to obtain the plurality of dishes.

The robot 100 may obtain the plurality of dishes that require washing by not only collecting the plurality of dishes placed on the table or the tray return station, but also obtaining a plurality of images of the plurality of dishes placed on the table, the tray return station, or the like. Here, the robot 100 may obtain the information about the plurality of dishes on the basis of the obtained image. Here, the information about the plurality of dishes may include the number of the plurality of dishes, a type of each of the plurality of dishes, or the like.

The robot 100 may determine a washing function of the external dishwasher 200 based on the obtained information about the plurality of dishes. Here, the washing function may indicate a washing process including washing time, washing method, or the like. The robot 100 may determine an appropriate washing process for the plurality of dishes obtained by the robot 100 based on the information about the plurality of dishes. In addition, the robot 100 may transmit the determined washing process to an external dishwasher, thus allowing the appropriate washing process to be performed for the plurality of dishes obtained by the robot 100.

In addition, the robot 100 may place the plurality of dishes in the external dishwasher 200 based on the obtained information about the plurality of dishes. In detail, the robot 100 may determine the order, location, or the like of the plurality of dishes placed in the external dishwasher 200 based on the obtained information about the plurality of dishes. In addition, the robot 100 may place the obtained plurality of dishes in the external dishwasher 200 based on the obtained information about the plurality of dishes.

In this way, the robot 100 according to one or more embodiments of the present disclosure may perform its function in a kitchen where most work in the restaurant or home is performed. Even in the home or restaurant that uses the dishwasher, a user has to intervene to collect the dishes, determine the washing process of the dishes, and put the dishes into the dishwasher. However, the robot 100 according to one or more embodiments of the present disclosure may further enhance user convenience by performing a task related to the dish washing that requires the user intervention on behalf of the user. Hereinafter, the robot 100 according to one or more embodiments of the present disclosure is described in detail with reference to FIGS. 2 to 6.

Figure 2:
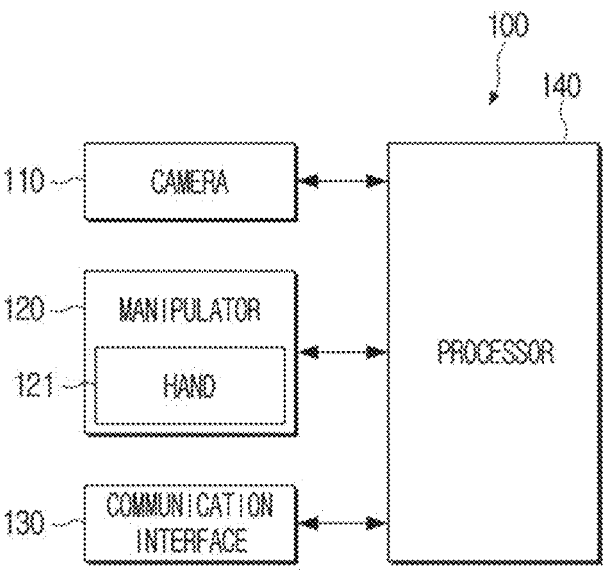
FIG. 2 is a schematic diagram of the robot according to one or more embodiments of the present disclosure.

FIG. 2 is a schematic diagram of the robot 100 according to one or more embodiments of the present disclosure.

Referring to FIG. 2, the robot 100 according to one or more embodiments of the present disclosure may include at least one camera 110, a manipulator 120, a communication interface 130, and a processor 140.

At least one camera 110 (hereinafter, the camera) may obtain an image of an object by capturing the object around the robot 100. In detail, the camera 110 may obtain the plurality of images of the dishes around the robot 100.

For this purpose, the camera 110 may be implemented as an imaging device such as the imaging device having a complementary metal-oxide-semiconductor (CMOS) image sensor (CIS) structure or the imaging device having a charge coupled device (CCD) structure. However, the present disclosure is not limited thereto, and the camera 110 may be implemented as a camera module having various resolutions that is capable of capturing a subject.

The camera 110 may be implemented as a depth camera (e.g., infrared (IR) depth camera), a stereo camera, or a red-green-blue (RGB) camera. In this way, the camera 110 may obtain the images of the dishes together with depth information of the dishes.

The manipulator 120 may be a component for performing motions similar to those of human arm and hand. In detail, the manipulator 120 may include a link corresponding to each of the upper and lower arms of the human arm. In detail, the manipulator 120 may include a first link corresponding to the upper arm (i.e., humerus) of the human arm and a second link corresponding to the lower arm (i.e., radius and ulna) of the human arm. Here, the first link and the second link may be connected to each other by a plurality of motors. The manipulator 120 may include a gripper or hand 121 (hereafter referred to as "hand") including a plurality of links that may correspond to a plurality of fingers. Here, a plurality of links (e.g., 4th to 8th links) corresponding to the plurality of fingers may be connected to the hand 121 as the plurality of motors. In addition, the hand 121 may be connected to the second link by the motor. However, the number and type of links of the manipulator 120 and the hand 121 is not limited to those described above.

The manipulator 120 may provide various motions similar to those of the human arm and hand by controlling the plurality of motors on the basis of a predetermined pose value. As an example, if a pose value for gripping the dishes is input into the manipulator 120 by the processor 140, the manipulator 120 may control the plurality of motors to grip the dishes on the basis of the input pose value.

The communication interface 130 may transmit or receive various types of content. In detail, the communication interface 130 may include at least one circuit, and communicate with various types of external devices based on various types of communication methods. For example, the communication interface 130 may transmit the washing information or the like to the external dishwasher 200 (hereinafter, referred to as the dishwasher) that links with the robot 100. Alternatively, the communication interface 130 may receive information about the dishwasher that links with the robot 100 from the dishwasher 200. Here, information about the dishwasher 200 may include information about a type of the dishwasher, a storage space in the dishwasher, or the like.

As an example, the communication interface 130 may receive or transmit a signal in a streaming or downloading manner from the external device (e.g., user terminal), an external storage medium (e.g., universal serial bus (USB) memory), an external server (e.g., web hard) or the like by using a communication method such as an access point (AP) based wireless fidelity (Wi-Fi, i.e., wireless local area network (LAN)), a Bluetooth, a Zigbee, a wired/wireless local area network (LAN), a wide area network (WAN), Ethernet, an IEEE 1394, a high definition multimedia interface (HDMI), a USB, a mobile high-definition link (MHL), an audio engineering society/European broadcasting union (AES/EBU) communication, an optical communication, or a coaxial communication.

The processor 140 may control overall operations of the robot 100. For this purpose, the processor 140 may include a random access memory (RAM), a read only memory (ROM), a central processing unit (CPU), and a graphics processing unit (GPU), and a system bus, or the like, and may perform calculations or data processing related to controlling at least one component included in the robot 100.

The processor 140 may control at least one component included in the robot 100 by executing at least one instruction stored in a storage, control at least one component as a hardware circuit or chip, or control at least one component as a combination of software and hardware. In detail, the processor 140 may be electrically connected to various components in the robot 100, including the camera 110, the manipulator 120, and the communication interface, and may control the same.

In one or more embodiments of the present disclosure, the processor 140 may obtain an image including a plurality of dishes 10 through the camera 110.

In detail, the processor 140 may obtain the images of the plurality of dishes 10 at a predetermined location or position. As an example, the processor 140 may be moved to the predetermined location or position if the plurality of dishes 10 are placed on the predetermined location or position or the processor 140 identifies that the tray including the plurality of dishes 10 are placed on the predetermined location or position. In addition, the processor 140 may obtain the images of the plurality of dishes 10 at the predetermined location or position.

As still another example, if the processor 140 receives a signal requesting to wash the plurality of dishes 10, the processor 140 may be moved to the location or position where the plurality of dishes 10 are placed. Here, the signal requesting to wash the plurality of dishes 10 may include information about the location or position where the plurality of dishes 10 are placed. Accordingly, the processor 140 may obtain the images of the plurality of dishes 10 by being moved using the information about the location or position where the plurality of dishes 10 are placed.

The predetermined location or position where the plurality of dishes 10 are placed may be implemented in various forms and places such as the tray return station, the tray return counter, the table, or the like, and may be set on map data for a space where the robot 100 is disposed.

The processor 140 may obtain the plurality of images including the plurality of dishes 10 through the camera 110. In detail, the processor 140 may control an actuator of the robot 100 to obtain the plurality of images of the plurality of dishes 10 at various time points.

Here, the image obtained through the camera 110 may include the depth information of the plurality of dishes 10. The processor 140 may identify a distance between the robot 100 and each of the plurality of dishes 10 based on the depth information of the obtained plurality of dishes 10 included in the image.

In addition, the robot 100 may analyze the shape, size, or the like of each of the plurality of dishes 10 by analyzing information about a space occupied by each of the plurality of dishes 10 based on the depth information. This feature is described in one or more embodiments of the present disclosure below.

In one or more embodiments of the present disclosure, the processor 140 may obtain information about the number of the plurality of dishes 10, the type of each of the dishes, and the size of each of the dishes on the basis of the images including the plurality of dishes 10 obtained through the camera 110.

In detail, the processor 140 may perform an object recognition process for the plurality of dishes 10 obtained through the camera 110. The processor 140 may identify the type of each of the plurality of dishes 10 and the number of the plurality of dishes 10 based on the images including the plurality of dishes 10 obtained through the camera 110.

For this purpose, the processor 140 may use point cloud data for the plurality of dishes 10 obtained through the camera 110. In detail, the images of the plurality of dishes 10 obtained through the camera 110 may include the point cloud data for each of the dishes. The point cloud data indicates a set of points corresponding to points where infrared rays output from the camera 110 are reflected from the object (i.e., plurality of dishes 10) and then received again by the camera 110. Accordingly, the processor 140 may obtain the point cloud data for each of the plurality of dishes 10.

The processor 140 may obtain the information about the plurality of dishes 10 by using a neural network model stored in a memory of the robot. In detail, the processor 140 may obtain the information about the type of each of the plurality of dishes 10 and the number of the plurality of dishes 10 by inputting the images of the obtained plurality of dishes 10 (or the point cloud data for the plurality of dishes 10) to the neural network model.

For this purpose, the neural network model may be a neural network model trained to identify the type of each of the dishes included in the plurality of images (or the plurality of point cloud data) by using the plurality of images (or the plurality of point cloud data) as learning data. As an example, the neural network model may be implemented as a convolutional neural network (CNN) model, a fully convolutional networks (FCN) model, a regions with convolutional neuron networks features (RCNN) model, and a you only look once (YOLO) model, or the like. Hereinafter, the neural network model trained to identify the type of each of the dishes is referred to as a first neural network model.

The processor 140 may obtain the information about the type of each of the dishes by inputting the images including the plurality of dishes 10 into the first neural network model. Alternatively, the processor 140 may obtain the information about the type of each of the dishes by cropping the images including the plurality of dishes 10 into the plurality of images respectively corresponding to the dishes and then inputting the cropped plurality of images into the first neural network model.

In addition, in one or more embodiments of the present disclosure, the processor 140 may obtain the image of each of the plurality of dishes 10 through the camera 110, and identify the size of each of the dishes on the basis of each of the images. Here, the size of the dish may indicate a volume of the dish.

In detail, the processor 140 may obtain the plurality of images of the respective dishes through the camera 110. Here, the plurality of images of the respective dishes may include the point cloud data for the respective dishes. In addition, the processor 140 may identify each of the dishes as a three-dimensional (3D) image corresponding to each of the dishes in a predetermined 3D coordinate space on the basis of the plurality of images. In addition, the processor 140 may calculate the size (or volume) of each of the dishes on the basis of coordinate values of the 3D image corresponding to each of the dishes identified in the 3D coordinate space.

In one or more embodiments of the present disclosure, the processor 140 may control the manipulator 120 to grip each of the dishes by using the hand 121 on the basis of at least one of information about the type of each of the dishes or the size of each of the dishes.

In detail, the processor 140 may identify a location on the dish to grip each of the dishes on the basis of the type of each of the dishes and the 3D image corresponding to each of the dishes identified in the predetermined 3D space. As an example, if a type of the dish is identified as a cup, and a handle is identified on the 3D image corresponding to the dish, the processor 140 may identify the identified handle as a point where the hand 121 of the robot is required to be positioned to grip the dish. In addition, the processor 140 may control the manipulator 120 to move the hand 121 to the identified handle and then grip the handle.

As still another example, the processor 140 may identify the location on the dish to grip each of the dishes on the basis of the information about the type of the dish and the size of the dish. As an example, if the type of the dish is identified as a plate, and the size of the dish identified as the plate is identified on the basis of the 3D image corresponding to the dish, the processor 140 may determine the location on the dish to stably grip the dish on the basis of the type of the dish, which is the plate, and the size of the dish.

In one or more embodiments of the present disclosure, the camera 110 may include the plurality of cameras 110. In detail, the camera 110 may include a first camera 111 mounted on the body or head of the robot and a second camera 112 mounted on the hand 121 of the robot.

Here, the processor 140 may obtain the images of the plurality of dishes 10 through the first camera 111. In detail, the processor 140 may capture the plurality of dishes 10 at the predetermined location or position through the first camera 111 at a plurality of time points and then obtain a first image 20 of the plurality of dishes 10. The first image 20 may include at least one dish out of the plurality of dishes 10.

The first image 20 may be distinguished from a second image 30 obtained through the second camera 112 in that the first image 20 may include the plurality of dishes 10. The reason is that the second image 30 includes one dish, unlike the first image 20.

Figure 3:
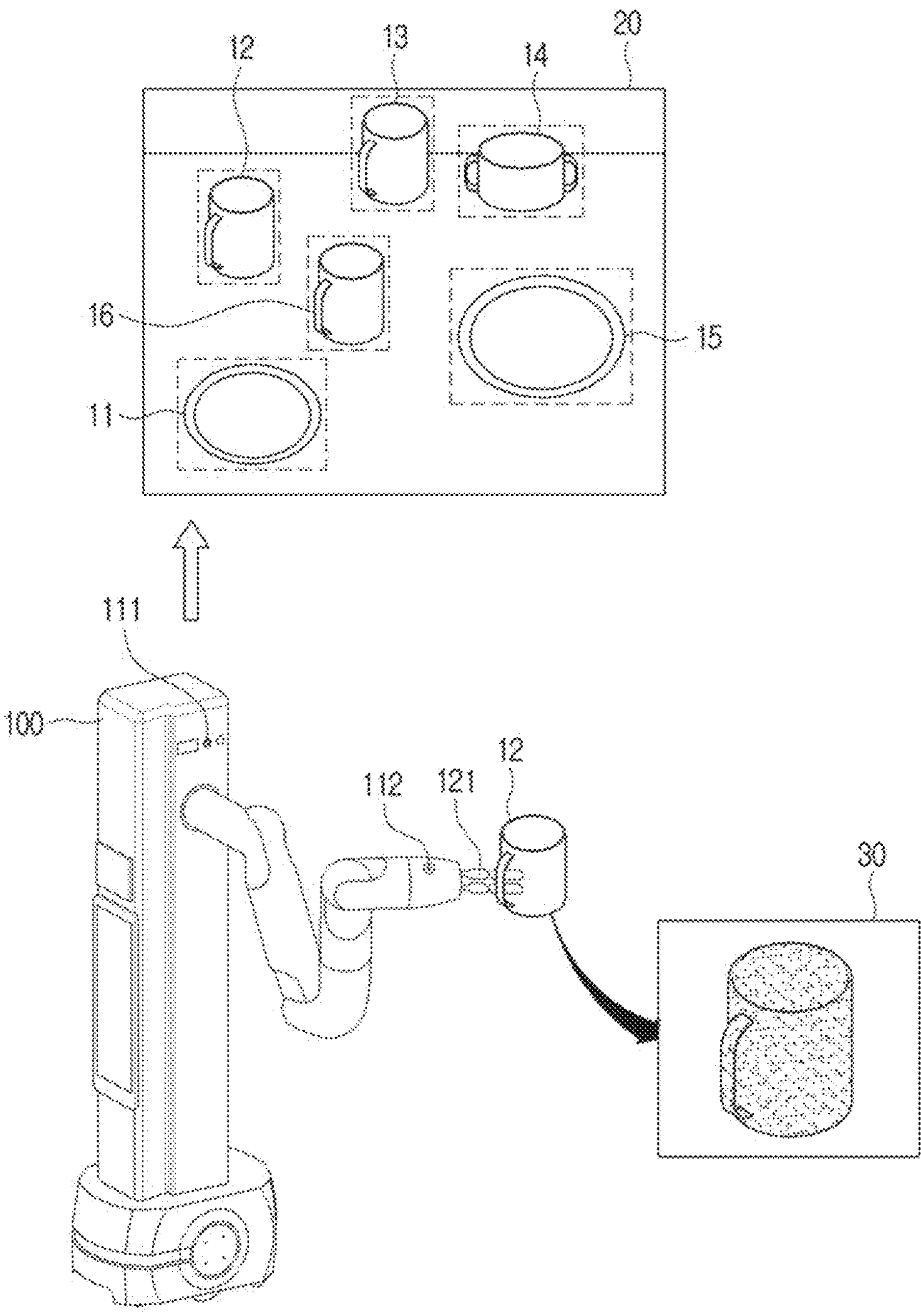
FIG. 3 is an example diagram describing a method for the robot to obtain information about a plurality of dishes according to one or more embodiments of the present disclosure.

Referring to FIG. 3, the processor 140 may obtain the first image 20 including the plurality of dishes 10 through the first camera 111 mounted on the body of the robot. In more detail, the processor 140 may obtain the first image 20, which includes three cups 12, 13, and 16, one pot 14, and two plates 11 and 15 (as used herein, cups, pots, and plates may also be collectively or generally referred to as "dishes").

The processor 140 may identify the number of the plurality of dishes 10 and the type of each of the plurality of dishes 10 on the basis of the plurality of first images 20 obtained through the first camera 111. This configuration may be equally applied to one or more embodiments of the present disclosure described above, and the description thus omits its detailed description.

In addition, the processor 140 may control the manipulator 120 to grip each of the dishes by using the hand 121 on the basis of the type of each of the dishes. In detail, the processor 140 may identify a point on each of the dishes to grip each of the dishes on the basis of the type of each of the dishes identified in the first image 20. In addition, the processor 140 may control the manipulator 120 to move the hand 121 of the robot to the identified point on each of the dishes and then to grip each point by using the hand 121 of the robot.

In addition, the processor 140 may obtain the plurality of second images 30 of the respective dishes through the second camera 112 while gripping each of the dishes with the hand 121, and may identify the size of each of the dishes based on the obtained multiple second images 30.

In detail, the processor 140 may control the manipulator 120 to grip the identified point on each of the dishes by using the hand 121 of the robot. The processor 140 may then obtain the plurality of second images 30 of the respective dishes through the second camera 112 while gripping each of the dishes by using the hand 121 of the robot. Here, unlike the first image 20, the second image 30 may include only one dish. That is, the processor 140 may identify the size of the dish more accurately by obtaining more detailed image (i.e., second image 30) of each of the dishes through the second camera 112 mounted on the hand 121 while gripping each of the dishes.

Referring to FIG. 3, the processor 140 may obtain the second image of a dish 13 corresponding to the cup through the second camera 112 while gripping the dish 13 corresponding to the cup among the plurality of dishes 10. Here, the second image 30 may include point cloud data of the dish 13 corresponding to the cup. The processor 140 may identify the dish 13 corresponding to the cup as the 3D image corresponding to the dish 13 in the predetermined 3D space based on the second image 30, and identify a size of the dish 13 on the basis of the coordinate values of the identified 3D image.

In one or more embodiments of the present disclosure, the processor 140 may identify the number of the plurality of dishes and the type of each of the dishes, as well as the distance between each of the dishes and the robot 100, on the basis of the first image 20. In addition, the processor 140 may control the manipulator 120 to obtain the plurality of images of the respective dishes at a predetermined distance on the basis of the distance between each of the identified dishes and the robot 100.

In detail, the processor 140 may control the manipulator 120 to maintain the distance between the hand 121 of the robot and each of the dishes at the predetermined distance. In addition, the processor 140 may obtain the plurality of second images 30 of the respective dishes through the second camera 112 mounted on the hand 121 of the robot at the predetermined distance. In addition, the processor 140 may identify the 3D image corresponding to each of the dishes in the predetermined 3D space on the basis of the obtained plurality of second images 30, and then identify the point on each of the dishes to grip each of the dishes on the basis of the type of each of the dishes and the 3D image corresponding to each of the dishes. In addition, the processor 140 may control the manipulator 120 to grip the identified point on each of the dishes by using the hand of the robot.

The processor 140 may determine the washing information of the dishwasher 200 for the plurality of dishes 10 on the basis of the number of the plurality of dishes 10, the type of each of the dishes, and the size of each of the dishes. In addition, the processor 140 may transmit the determined washing information to the dishwasher 200 through the communication interface 130.

The washing information may be information about the washing process of the dishwasher 200. As an example, the washing information may include the washing time, washing intensity, rinsing time, drying time, or the like of at least one dish stored in the dishwasher 200.

The processor 140 may determine the washing time, rinsing time, drying time, or the like of the dishwasher 200 on the basis of the number of the plurality of dishes 10. As an example, the processor 140 may determine the washing time, the rinsing time, the drying time, or the like based on the number of the plurality of dishes 10.

For this purpose, the processor 140 may use the information about the dishwasher 200 that is stored in the memory of the robot. The memory of the robot may include control information for the dishwasher 200. As an example, the memory of the robot may store instruction information for performing a process related to washing the dishes in the dishwasher 200. Alternatively, the memory of the robot may also store information about the washing process performed by the dishwasher 200.

Accordingly, the processor 140 may determine the washing process suitable for the plurality of dishes 10. In addition, the processor 140 may transmit the washing information about the determined washing process to the dishwasher 200 through the communication interface 130.

In more detail, the processor 140 may control the manipulator 120 to sequentially dispose the plurality of dishes 10 in the dishwasher 200, and then transmit the determined washing information to the dishwasher 200 through the communication interface 130 on the basis of the number of the plurality of dishes 10, the type of each of the dishes, and the size of each of the dishes if all of the plurality of dishes 10 are disposed in the dishwasher 200. The dishwasher 200 may perform the washing process for the plurality of dishes 10 stored in the dishwasher 200 based on the received washing information.

Hereinafter, the description describes in detail one or more embodiments of determining the washing information for the plurality of dishes 10 by using the information of the identified plurality of dishes 10 on the basis of the plurality of images (i.e., first image 20 and second image 30) obtained through the camera 110 (i.e., first camera 111 and second camera 112) and disposing the plurality of dishes 10 in the dishwasher 200.

Figure 4:
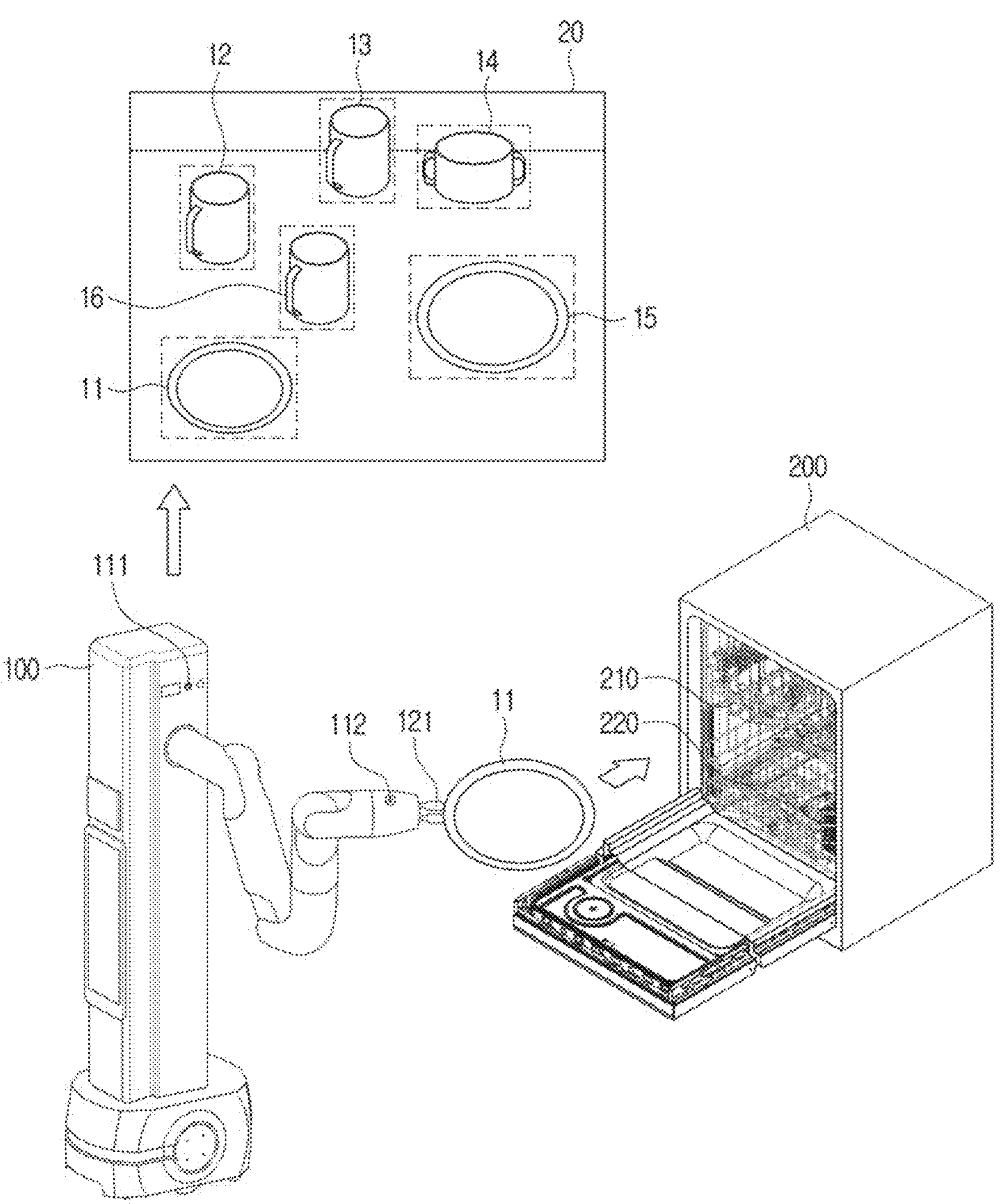
FIG. 4 is an example diagram for describing a method for the robot to determine the arrangement order and arrangement positions of the dishes on the basis of the information about the dishes according to one or more embodiments of the present disclosure.

FIG. 4 is an example diagram for describing a method for the robot 100 to determine the arrangement order and arrangement positions of the dishes on the basis of the information about the dishes according to one or more embodiments of the present disclosure.

According to one or more embodiments of the present disclosure, the processor 140 may determine the arrangement order of the plurality of dishes 10 on the basis of the type of each of the dishes, and control the manipulator 120 to dispose the plurality of dishes 10 in the dishwasher 200 based on the determined arrangement order.

In detail, the processor 140 may determine the arrangement order of the plurality of dishes 10 to be disposed in the dishwasher 200 on the basis of the type of each of the dishes. In addition, the processor 140 may sequentially dispose the plurality of dishes 10 in the dishwasher 200 on the basis of the determined arrangement order. In detail, the processor 140 may control the manipulator 120 to grip the dishes by using the hand 121 of the robot based on the determined arrangement order. In addition, the processor 140 may control the manipulator to dispose the dish gripped by the hand 121 of the robot into the dishwasher 200, and then control the manipulator 120 again to grip the dish in the next order.

Here, the arrangement order may be determined on the basis of the type of each of the dishes included in the plurality of dishes 10. In detail, the processor 140 may identify the type of each of the dishes and then determine the arrangement order in which the plurality of dishes 10 may be appropriately disposed in the dishwasher 200.

As an example, the processor 140 may determine the arrangement order in a fast order (first order) for a type of dish (first type) that is large in size, such as a large plate, pot, or the like. In addition, the processor 140 may determine the arrangement order in a slow order (second order) for the type of the dish (second type) that is small in size, such as a small plate, cup, or the like.

The processor 140 may determine not to dispose the dishes in the dishwasher 200 if the type of the dish is identified as being a type that is not capable of being stored in the dishwasher 200. As an example, if a frying pan is set as a type that is not capable of being stored in the dishwasher 200, the processor 140 may identify whether there is a dish corresponding to the frying pan among the plurality of dishes 10 based on the image obtained through the camera 110. In addition, if the processor 140 identifies that the dish corresponding to the frying pan is present, the processor 140 may determine not to dispose the corresponding dish in the dishwasher 200.

The processor 140 may also determine the arrangement order on the basis of the type of each of the dishes and the size of each of the dishes.

For this purpose, in one or more embodiments of the present disclosure, the processor 140 may determine the arrangement order of the plurality of dishes 10 corresponding to the first type on the basis of the sizes of the plurality of dishes 10 corresponding to the first type if the number of dishes corresponding to the first type is plural.

In detail, the processor 140 may compare the sizes of the plurality of dishes 10 corresponding to the same type with each other if the plurality of dishes 10 corresponding to the same type are present. In more detail, the processor 140 may obtain the information about the size (or volume) of each of the dishes on the basis of the second image 30. Here, the processor 140 may compare the sizes (or volumes) of the plurality of dishes 10 corresponding to the same type with each other based on the information about the obtained sizes (or volumes) of the plurality of dishes. In addition, the processor 140 may sequentially dispose the dishes among the plurality of dishes 10 corresponding to the same type, starting with one having a larger size (or volume), in the dishwasher 200.

Referring to FIG. 4, the processor 140 may identify two dishes corresponding to plates as the type of the dishes and three dishes corresponding to the cups as the type of the dishes. Here, the processor 140 may compare the sizes of two dishes corresponding to the plates with each other and dispose the dishes, starting with the dish having the larger size in the dishwasher 200. In addition, the processor 140 may compare the sizes of three dishes corresponding to the cups with one another and then dispose the dishes starting with the dish having the largest size in the dishwasher 200.

The processor 140 may identify the arrangement position of each of the dishes in the dishwasher 200 on the basis of the type of each of the dishes and the size of each of the dishes, and control the manipulator 120 to dispose each of the dishes at the identified arrangement position of each of the dishes.

In detail, the processor 140 may obtain the information about the space where the plurality of dishes 10 are disposed in the dishwasher 200. The processor 140 may obtain the space information in various ways. As an example, the processor 140 may obtain, from the dishwasher 200, the information about the space where the dishes are disposed (for example, the number of trays disposed in the dishwasher 200, the size of the tray, or the like) in the dishwasher 200 that links with the robot 100.

Alternatively, the processor 140 may obtain the plurality of images of the dishwasher 200 through the camera 110 while a door of the dishwasher 200 is opened and then obtain the information about the space in the dishwasher 200 based on the obtained images.

Alternatively, the processor 140 may obtain three-dimensional information about the space in the dishwasher 200 based on sensing information obtained through a sensor of the robot, and then analyze the obtained three-dimensional information to obtain the information about the space where the dishes are disposed.

In this way, the processor 140 may obtain the information about the space in the dishwasher 200 and then implement the space in the dishwasher 200 in the predetermined three-dimensional coordinate space based on the obtained space information. As an example, referring to FIG. 4, if the dishwasher 200 includes a plurality of trays 210 and 220 which are vertically disposed, the processor 140 may identify the plurality of trays 210 and 220 in the predetermined three-dimensional coordinate space. For example, the processor 140 may obtain cloud point data for the plurality of trays 210 and 220 and then identify the plurality of trays 210 and 220 in the predetermined 3D space based on the obtained cloud point data.

In addition, the processor 140 may identify the space in the dishwasher 200 in the predetermined 3D space and then identify the coordinate value, i.e., the location where each of the dishes is disposed. The location where each of the dishes is disposed may be identified on the basis of the type of the dish and the size of the dish.

In addition, according to one or more embodiments of the present disclosure, the processor 140 may determine the washing time of the dishwasher 200 for the plurality of dishes 10 on the basis of the number of the plurality of dishes 10, and transmit the determined washing time as the washing information for the plurality of dishes 10 to the dishwasher 200 through the communication interface 130.

In detail, the processor 140 may determine the washing time of the dishwasher 200 on the basis of the number of the plurality of dishes 10 included in the image obtained through the camera 110. Here, the washing time of the dishwasher 200 may include the rinsing time and drying time for the plurality of dishes 10 stored in the dishwasher 200.

The processor 140 may determine the washing time for the plurality of dishes 10 based on a time corresponding to the number of the plurality of dishes 10. That is, the processor 140 may set the washing time of the dishwasher 200 to a longer time as the number of the plurality of dishes 10 is increased.

As still another example, the processor 140 may determine the washing time for the plurality of dishes 10 as a first time if the number of the plurality of dishes 10 is greater than or equal to a predetermined number, and determine the washing time for the plurality of dishes 10 as a second time if the number of the plurality of dishes 10 is less than the predetermined number. Here, the first time may be set to a larger value than the second time.

The processor 140 may transmit the determined washing time to the dishwasher 200, which links with the robot 100, through the communication interface 130. Accordingly, if the processor 140 controls the manipulator 120 to dispose the plurality of dishes 10 in the dishwasher 200, the dishwasher 200 may perform the washing process for the plurality of dishes 10 stored in the dishwasher 200 on the basis of the washing time of the dishes that is determined by the processor 140.

The processor 140 may determine an amount of detergent used in the dishwasher 200 based on the number of the plurality of dishes 10. That is, the processor 140 may determine the amount of detergent to be injected into the dishwasher 200 based on the number of the plurality of dishes 10.

In addition, in one or more embodiments of the present disclosure, the processor 140 may classify the plurality of dishes 10 into a first wash group and a second wash group on the basis of the type of each of the dishes and the size of each of the dishes if the number of the plurality of dishes 10 is greater than or equal to the predetermined number, identify the number of dishes included in each of the first wash group and the second wash group, and determine a washing order of the first wash group and the second wash group on the basis of the identified number of dishes.

In detail, the processor 140 may identify whether the number of the plurality of dishes 10 is greater than or equal to the predetermined number. Here, if the number of the plurality of dishes 10 is less than the predetermined number, the processor 140 may dispose the plurality of dishes 10 in the dishwasher 200 on the basis of one or more embodiments of the present disclosure described above.

On the other hand, if the number of the plurality of dishes 10 is greater than or equal to the predetermined number, the processor 140 may classify the plurality of dishes 10 into the plurality of wash groups. Here, the plurality of dishes 10 may be classified into the plurality of wash groups on the basis of the type of each of the dishes and the size of each of the dishes.

As an example, the processor 140 may classify the plurality of dishes 10 for the dishes having similar sizes to belong to the same wash group. The processor 140 may classify the dish whose size is greater than or equal to a predetermined size into the first wash group and the dish whose size is less than the predetermined size into the second wash group. As an example, the processor 140 may classify relatively large pots and plates into the first wash group, and relatively small cups and plates into the second wash group.

In addition, the processor 140 may identify the number of the plurality of dishes 10 belonging to each wash group. Here, the processor 140 may determine the washing order for the plurality of dishes 10 belonging to a wash group including a large number of dishes to be washed first. The embodiment of the present disclosure described above may be equally applied to the plurality of dishes 10 included in the same wash group. That is, the processor 140 may determine the arrangement order of the plurality of dishes 10 in the dishwasher 200 on the basis of the types and sizes of the dishes included in the same wash group, and determine the arrangement positions of the dishes in the dishwasher 200.

In detail, referring to FIG. 4, if the number of dishes corresponding to a criterion for classifying the plurality of dishes 10 into the plurality of wash groups is five, the processor 140 may classify the plurality of dishes 10 into two wash groups. Here, the processor 140 may classify the dish 14 corresponding to the pot as the first wash group, and the plurality of dishes 12, 13, and 16 corresponding to the cups as the second wash group, on the basis of the information about the type and size of the dish. In addition, the processor 140 may determine the wash group for the plurality of dishes 10 corresponding to the plates on the basis of the size of the dish. In detail, the processor 140 may classify the dish 15 identified as being larger than the predetermined size among the plurality of dishes 10 corresponding to the plates as the first wash group, and the dish 11 identified as being less than the predetermined size as the second wash group. In addition, the processor 140 may identify the number of the plurality of dishes 10 included in each wash group. According to one or more embodiments described above, the processor 140 may identify the number of the plurality of dishes 10 included in the first wash group as two and the number of the plurality of dishes 10 included in the second wash group as four. Here, the processor 140 may determine the washing order for the plurality of dishes 10 included in the second wash group, which has a greater number of dishes, to be washed before the plurality of dishes 10 included in the first wash group.

According to one or more embodiments of the present disclosure, the processor 140 may classify the plurality of dishes into the plurality of wash groups (i.e., first wash group and second wash group) further on the basis of the sizes of the plurality of dishes 10 together with the number of the plurality of dishes 10. In detail, the processor 140 may classify the plurality of dishes 10 into the plurality of wash groups (i.e., first wash group and second wash group) if the sum of the sizes of the plurality of dishes 10 is greater than or equal to the predetermined size even though the number of the plurality of dishes 10 is greater than or equal to the predetermined number, or the number of the plurality of dishes 10 is less than the predetermined number.

In one or more embodiments of the present disclosure, for the plurality of dishes 10, the processor 140 may set the number of dishes corresponding to the criterion for classifying the plurality of wash groups differently depending on the dishwasher 200. In detail, the processor 140 may identify the number of dishes and the sizes of the dishes that are capable of being stored in the dishwasher 200 based on the information about the space in the dishwasher 200, and then set the number of dishes.

In addition, in one or more embodiments of the present disclosure, the processor 140 may transmit a signal requesting to open the door of the dishwasher 200 through the communication interface 130 if a distance between the robot 100 and the dishwasher 200 is less than the predetermined distance.

In detail, a shape of the door of the dishwasher 200 may be formed to fit a person. As an example, the shape or form of a handle of the door may be formed to fit a human hand for the handle to be opened or closed by the human hand.

Therefore, unless the dishwasher 200 having a door that fits the hand 121 of the robot is manufactured, it may be difficult for the robot 100 to control the door of the dishwasher 200. It may also be difficult to manufacture the dishwasher 200 having the door that fits the hand 121 of the robot.

Accordingly, in one or more embodiments of the present disclosure, the processor 140 may transmit information indicating that the robot 100 is capable of using the dishwasher 200 to allow the robot 100 to open the door of the dishwasher 200 without manipulating the door of the dishwasher 200.

For this purpose, if the robot 100 transmits information indicating that the user requests to collect the plurality of dishes 10, or if the robot 100 is adjacent to the dishwasher 200, the processor 140 may transmit the signal requesting to open the door of the dishwasher 200 through the communication interface 130.

In detail, the processor 140 may obtain sensing information about a distance between the objects around the robot 100 through the sensor of the robot. Here, the processor 140 may identify the distance between the robot 100 and the dishwasher 200 around the robot 100 based on the obtained sensing information. As an example, the processor 140 may obtain data for the distance between the dishwasher 200 and the robot 100 through the sensor if the dishwasher 200 is identified on the basis of the image obtained through the camera 110.

In addition, the processor 140 may transmit the signal requesting to open the door of the dishwasher 200 through the communication interface 130 if the distance between the robot 100 and the dishwasher 200 is less than the predetermined distance. In addition, the processor 140 may put the plurality of dishes 10 into the dishwasher 200 whose door is opened.

The processor 140 may identify a real-time location of the robot on the basis of the map data stored in the memory, and may also identify the distance between the identified real-time location of the robot and the location of the dishwasher 200 set on the map data.

In one or more embodiments of the present disclosure, the processor 140 may determine an operation speed of the dishwasher 200 on the basis of the number of the plurality of dishes 10, and transmit the determined operation speed as the washing information for the plurality of dishes 10 to the dishwasher 200 through the communication interface 130.

In detail, the dishwasher 200 may be classified into several types. The processor 140 may identify the type of dishwasher 200 that links with the robot 100 before determining the washing information. In detail, the processor 140 may connect the robot 100 and the dishwasher 200 to each other through the communication interface 130 and then obtain the information about the dishwasher 200 from the dishwasher 200. Here, the information about the dishwasher 200 may include type information of the dishwasher 200.

Figure 5:
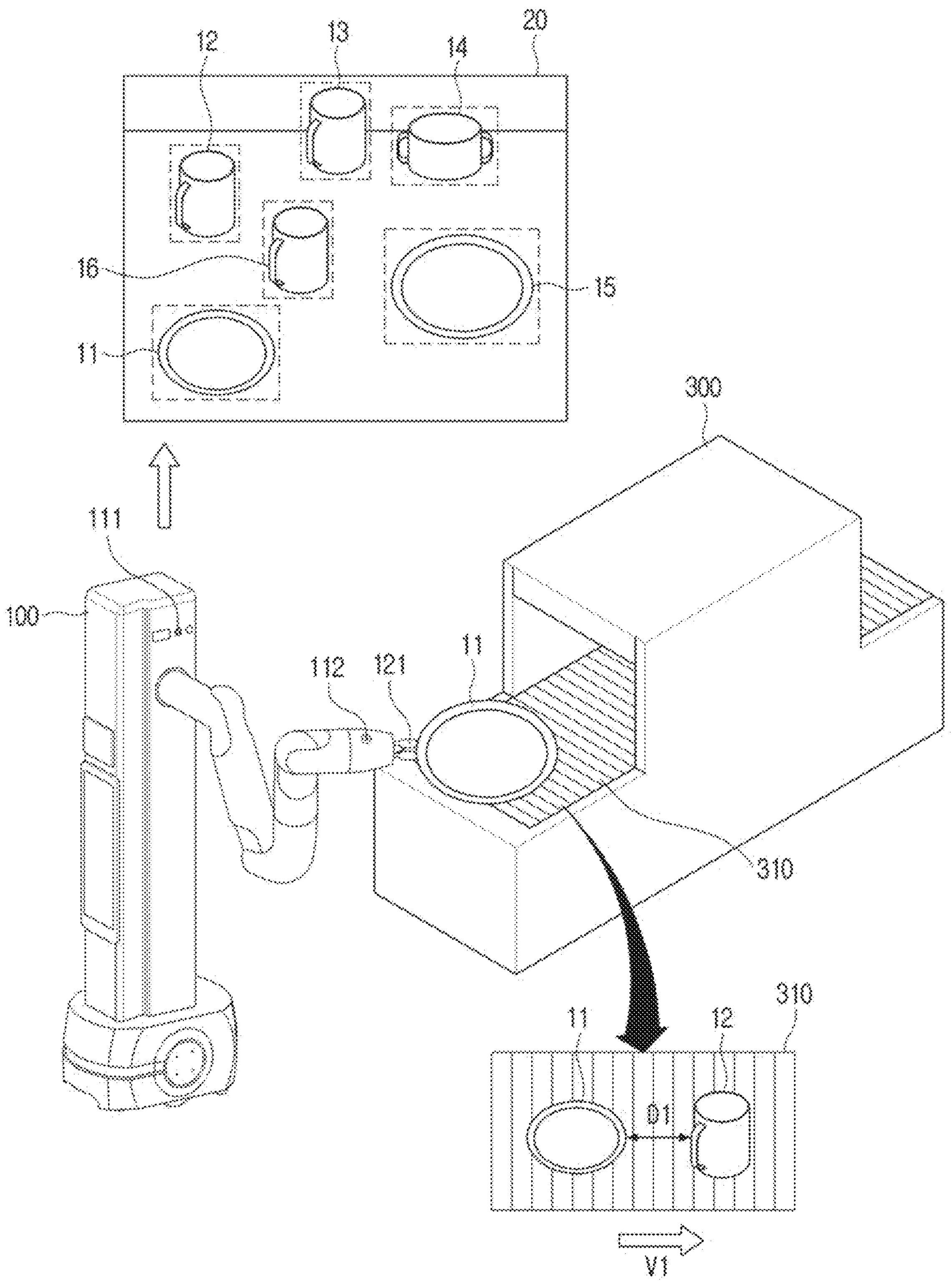
FIG. 5 is an example diagram showing that an operation speed of a dishwasher is determined on the basis of the information about the number of the plurality of dishes according to one or more embodiments of the present disclosure.

As an example, the dishwasher 200 may be classified into a door-type dishwasher 200 shown in FIGS. 3 and 4 and a conveyor-type dishwasher 300 shown in FIG. 5. Here, the processor 140 may obtain information about the type of the dishwasher 200 (i.e., whether the dishwasher is the door-type dishwasher 200 or the conveyor-type dishwasher 300) from the dishwasher 200 through the communication interface 130. Here, for the door-type dishwasher 200, the information about the dishwasher 200 may include the number of trays in which the dishes are stored, their sizes, and the control information for the dishwasher 200. Alternatively, for the conveyor-type dishwasher 300, the information about the dishwasher 300 may include a speed of a conveyor 310, a length of the conveyor 310, and the control information for the dishwasher 200.

FIG. 5 is an example diagram showing that the operation speed of the dishwasher 200 is determined on the basis of the information about the number of the plurality of dishes 10 according to one or more embodiments of the present disclosure.

The processor 140 may determine the operation speed of the dishwasher 200 on the basis of the number of the plurality of dishes 10 if the dishwasher 200 is identified as the conveyor-type dishwasher 300. Here, the operation speed of the dishwasher 200 may be an operation speed of the conveyor 310 disposed in the dishwasher 200.

The processor 140 may determine the operation speed of the dishwasher 200 as a first speed if the number of the plurality of dishes 10 is greater than or equal to the predetermined number, and determine the operation speed of the dishwasher 200 as a second speed if the number of the plurality of dishes 10 is less than the predetermined number. Here, the first speed may be set to a value greater than the second speed.

Referring to FIG. 5, in case that the predetermined number is ten, the processor 140 may determine the operation speed of the dishwasher 200 as v1 if the number of the plurality of dishes 10 is identified as six based on the first image 20. Here, the processor 140 may transmit information about the determined operation speed to the dishwasher 200 through the communication interface 130. Accordingly, the plurality of dishes 10 placed on the conveyor 310 of the dishwasher 200 may be moved within the dishwasher 200 at the speed of v1 by the manipulator 120 under the control of the processor.

In addition, the processor 140 may determine a spacing at which the plurality of dishes 10 are disposed on the conveyor 310 of the dishwasher 200 based on the number of the plurality of dishes 10 if the dishwasher 200 is identified as the conveyor-type dishwasher.

That is, in case of the conveyor-type dishwasher 300, where the plurality of dishes 10 are washed sequentially, unlike the door-type dishwasher 200, where the plurality of dishes 10 are washed simultaneously, the processor 140 may determine the spacing at which the plurality of dishes 10 are disposed on the basis of the number of the plurality of dishes 10. The spacing at which the plurality of dishes 10 are disposed may be related to a period at which the processor 140 controls the manipulator 120 to dispose each of the dishes on the conveyor 310. That is, the narrower the spacing at which the plurality of dishes 10 are disposed, the more the processor 140 may control the manipulator 120 to dispose each of the dishes on the conveyor 310 in a shorter period.

In detail, the processor 140 may determine the spacing at which the plurality of dishes 10 are disposed as a first spacing if the number of the plurality of dishes 10 is greater than or equal to the predetermined number, and determine the spacing at which the plurality of dishes 10 are disposed as a second spacing if the number of the plurality of dishes 10 is less than the predetermined number. Here, the first spacing may be set to a smaller value than the second spacing.

Referring to FIG. 5, in case that the predetermined number is ten, the processor 140 may determine the spacing at which the plurality of dishes 10 are disposed on the conveyor 310 of the dishwasher 200 as d1 if the number of the plurality of dishes 10 is identified as six based on the first image 20. Accordingly, the processor 140 may dispose the cup corresponding to a first dish on the conveyor 310, and then determine a time for disposing the dish corresponding to a second dish on the conveyor 310 on the basis of the speed of the conveyor 310 and d1. In addition, the processor 140 may dispose the plate corresponding to the second dish on the conveyor 310 if a determined time arrives. The determined time may be used as a period for disposing the remaining dishes.

In one or more embodiments of the present disclosure described above with reference to FIGS. 3 and 4, if the dishwasher 200 is identified as the door-type dishwasher 200, the processor 140 may determine the washing information for the plurality of dishes 10, and determine the arrangement order of each of the dishes and the arrangement positions of the plurality of dishes 10 in the dishwasher 200.

The processor 140 may receive a signal from the dishwasher 200 through the communication interface 130 indicating that the washing process of the dishes is ended. Here, the processor 140 may control the manipulator 120 to retrieve the plurality of dishes 10 stored in the dishwasher 200. In addition, the processor 140 may dispose the retrieved plurality of dishes 10 at the predetermined location or position.

Figure 6:
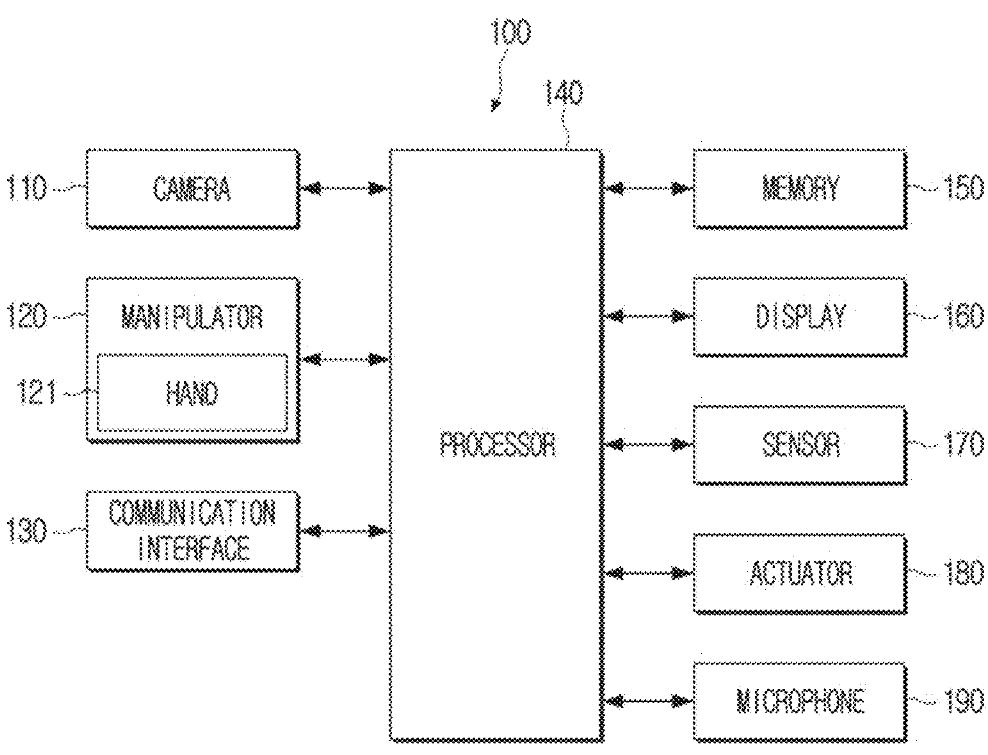
FIG. 6 is a detailed diagram of the robot according to one or more embodiments of the present disclosure.

FIG. 6 is a detailed diagram of the robot according to one or more embodiments of the present disclosure.

Referring to FIG. 6, according to one or more embodiments of the present disclosure, the robot 100 may include the camera 110, the manipulator 120, the communication interface 130, the memory, a display, the sensor, the actuator, and a microphone. The description omits detailed descriptions of the components shown in FIG. 6 that overlap with the components shown in FIG. 2.

A memory 150 may store data necessary for one or more embodiments of the present disclosure. As an example, the memory 150 may store the map data of a driving space where the robot 100 is disposed. Alternatively, the memory 150 may store the first neural network model trained to identify the type of the dish and the second neural network model trained to identify the size of the dish.

The memory 150 may be implemented in the form of a memory embedded in the robot 100 or in the form of a memory detachable from to the robot 100 based on a purpose of data storage. For example, data for driving the robot 100 may be stored in the memory embedded in the robot 100, and data for an extended function of the robot 100 may be stored in the memory detachable from the robot 100.

The memory embedded in the robot 100 may be implemented as at least one of a volatile memory (for example, a dynamic random access memory (DRAM), a static RAM (SRAM), or a synchronous dynamic RAM (SDRAM)), or a non-volatile memory (for example, an one time programmable read only memory (OTPROM), a programmable ROM (PROM), an erasable and programmable ROM (EPROM), an electrically erasable and programmable ROM (EEPROM), a mask ROM, a flash ROM, a flash memory (for example, a NAND flash or a NOR flash), a hard drive, or a solid state drive (SSD)).

A display 160 may display various data information. As an example, the display 160 may display information about the map data, a driving path of the robot 100, or the like. Alternatively, the display 160 may display the information about the type of the dish, the size of the dish, the number of the plurality of dishes 10, identified by the processor 140. Alternatively, the display 160 may display the washing information that is determined by the processor 140.

For this purpose, the display 160 may be implemented as a display including a self-light emitting element or a display including a non-self-light emitting element and a backlight. For example, the display 160 may be implemented in any of various types of displays such as a liquid crystal display (LCD), an organic light emitting diode (OLED) display, a light emitting diode (LED) display, a micro light emitting diode (micro LED) display, a mini LED display, a plasma display panel (PDP), a quantum dot (QD) display, or a quantum dot light-emitting diode (QLED) display.

The display 160 may also include a driving circuit, a backlight unit, and the like, which may be implemented in a form such as an a-si thin film transistor (TFT), a low temperature poly silicon (LTPS) TFT, or an organic TFT (OTFT). The display 160 may be implemented as a touch screen coupled with a touch sensor, a flexible display, a rollable display, a three-dimensional (3D) display, a display in which a plurality of display modules are physically connected with each other, or the like.

In addition, the display 160 may also be configured as a touch screen with a touch panel.

In this way, the display 160 may function as an output device that outputs information between the robot 100 and the user, and simultaneously function as an input device that provides an input interface between the robot 100 and the user.

A sensor 170 may obtain information about the object around the robot 100. As an example, the sensor 170 may be implemented as a light detection and ranging (LiDAR) sensor, a time of flying (TOF) sensor, or the like. The sensor 170 may detect the distance between the robot 100 and each of the dishes or the dishwasher 200, and obtain sensing data corresponding to the distance. Alternatively, the sensor 170 may obtain the point cloud data for the plurality of dishes 10.

An actuator 180 may be a device that may drive the robot 100. The actuator 180 may adjust the driving direction and driving speed of the robot 100 under control of the processor 140. The actuator 180 according to one or more embodiments may include a power generation device that generates power for driving the robot 100 (e.g., gasoline engine, a diesel engine, a liquefied petroleum gas (LPG) engine, or an electric motor, depending on a fuel (or energy source) used therefor, and a steering device for adjusting the driving direction (e.g., manual steering, hydraulics steering, or electronic control power steering (EPS)).

In addition, the actuator 180 may be implemented as the wheel or a leg of the robot 100. The processor 140 may transmit an electric signal to the power generation device of the actuator 180 to thus control the actuator 180, thereby controlling various driving operations of the robot 100, such as its movement, stopping, speed control, and direction change.

A microphone 190 may receive a user voice. Here, the user voice may be a voice for executing a specific function of the robot 100. If the user voice for executing the specific function is received through the microphone, the processor 140 may convert the user voice into a digital signal by using a speech to text (STT) algorithm and identify the control information corresponding to the user voice. In addition, the processor 140 may control the robot 100 to perform a function requested by the user on the basis of the identified control information. The microphone 190 may also receive a voice signal indicating that the washing process of the dishwasher 200 is ended. Therefore, if the processor 140 receives, through the microphone 190, the voice signal indicating that the washing process of the dishwasher 200 is ended, the processor 140 may control the manipulator 120 to retrieve the plurality of dishes 10 stored in the dishwasher 200.

Figure 7:
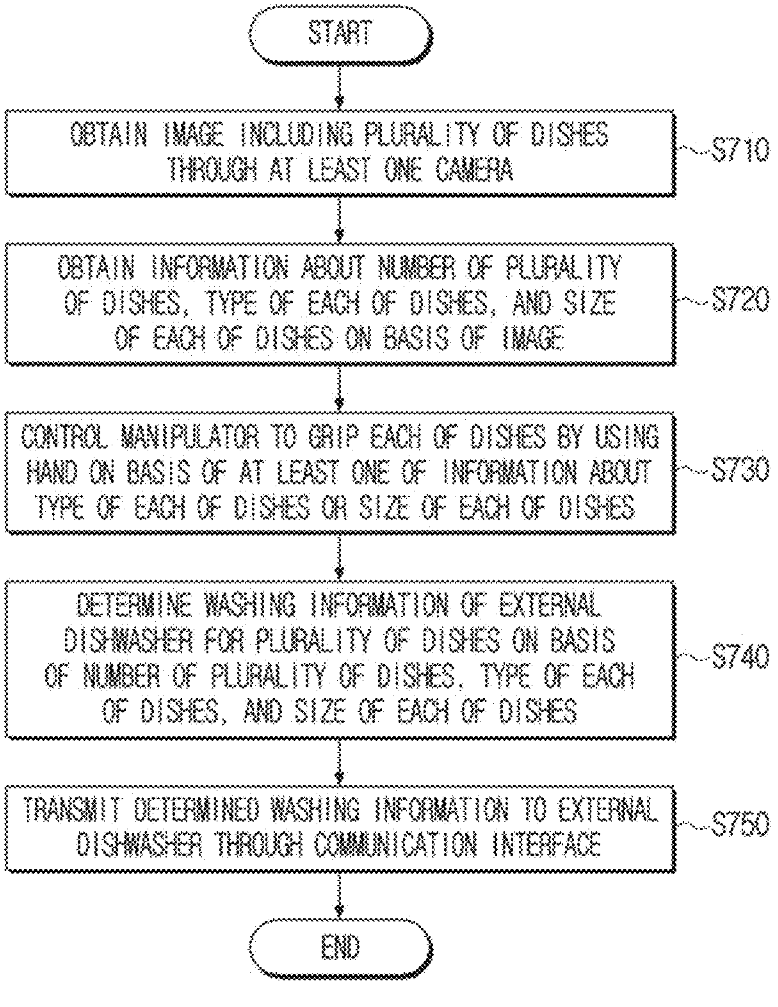
FIG. 7 is a flowchart schematically showing a control method of a robot according to one or more embodiments of the present disclosure.

FIG. 7 is a flowchart schematically showing a control method of a robot according to one or more embodiments of the present disclosure.

Referring to FIG. 7, the processor 140 may obtain the image including the plurality of dishes 10 through at least one camera 110 (S710).

In addition, the processor 140 may obtain the information about the number of the plurality of dishes 10, the type of each of the dishes, and the size of each of the dishes on the basis of the obtained image, and control the manipulator 120 of the robot to grip each of the dishes by using the hand 121 of the robot on the basis of at least one of the information about the type of each of the dishes or the size of each of the dishes (S720, S730).

In addition, the processor 140 may determine the washing information of the dishwasher 200 for the plurality of dishes 10 on the basis of the number of the plurality of dishes 10, the type of each of the dishes, and the size of each of the dishes (S740).

In addition, the processor 140 may determine the washing information of the dishwasher 200, and then transmit the determined washing information to the dishwasher 200 through the communication interface 130 of the robot (S750).

In one or more embodiments of the present disclosure, at operation S730, the processor 140 may determine the washing time of the dishwasher 200 for the plurality of dishes on the basis of the number of the plurality of dishes 10. In addition, at operation S740, the processor 140 may transmit the determined washing time as the washing information for the plurality of dishes to the dishwasher 200 through the communication interface.

The processor 140 may set the washing information differently depending on the type of the dishwasher 200. In detail, the processor 140 may determine the washing time of the dishwasher 200 on the basis of the number of the plurality of dishes 10 as described above, if the type of the dishwasher is the door-type dishwasher. On the other hand, the processor 140 may determine the operation speed of the dishwasher on the basis of the number of the plurality of dishes 10 if the type of the dishwasher 200 is the conveyor-type dishwasher 300.

Here, the processor 140 may transmit the determined operation speed as the washing information for the plurality of dishes to the dishwasher 200 through the communication interface. For this purpose, the processor 140 may perform a process of identifying the type of the dishwasher 200 before determining the washing information (S730).

In addition, in one or more embodiments of the present disclosure, at operation S730, the processor 140 may classify the plurality of dishes into the first wash group and the second wash group on the basis of the type of each of the dishes and the size of each of the dishes if the number of the plurality of dishes 10 is greater than or equal to the predetermined number. In addition, the processor 140 may identify the number of dishes included in each of the first wash group and the second wash group, and determine the washing order of the first wash group and the second wash group on the basis of the identified number of dishes.

According to one or more embodiments of the present disclosure, the processor 140 may classify the plurality of dishes into the plurality of wash groups on the basis of the sizes of the plurality of dishes 10 together with the number of the plurality of dishes 10. In detail, the processor 140 may classify the plurality of dishes 10 into the plurality of wash groups if the sum of the sizes of the plurality of dishes 10 is greater than or equal to the predetermined size even though the number of the plurality of dishes 10 is less than the predetermined number.

In addition, in one or more embodiments of the present disclosure, the processor 140 may determine the arrangement order of the plurality of dishes 10 on the basis of the type of each of the dishes. In detail, the processor 140 may determine the order in which the plurality of dishes 10 are disposed in the dishwasher 200 on the basis of the type of each of the dishes. In addition, the processor 140 may control the manipulator 120 to dispose the plurality of dishes 10 in the dishwasher 200 based on the determined arrangement order.

In determining the arrangement order of the plurality of dishes 10, the processor 140 may determine the arrangement order of the plurality of dishes corresponding to the first type on the basis of the sizes of the plurality of dishes corresponding to the first type if the plurality of dishes correspond to the first type. That is, if the plurality of dishes correspond to the same type of dish among the plurality of dishes 10, the processor 140 may determine the arrangement order on the basis of the size of each of the plurality of dishes corresponding to the same type of dish. As an example, if the plurality of dishes are identified as corresponding to the dishes whose type is the cup, the processor may identify the sizes of the plurality of cups and determine the arrangement order of the plurality of cups in the order of larger-sized cups.

In one or more embodiments of the present disclosure, the processor 140 may identify the arrangement position of each of the dishes in the dishwasher 200 on the basis of the plurality of dishes, the type of each of the dishes, and the size of each of the dishes. In detail, the processor 140 may determine the arrangement position of each of the dishes by considering the type of each of the dishes and the size of each of the dishes for the plurality of dishes to be appropriately disposed in the dishwasher 200. As an example, if the type of the dish is the pot and the size of the dish is greater than or equal to the predetermined size, the processor may determine the arrangement positions of the dishes on the tray 220 disposed at the bottom among the plurality of trays 210 and 220 vertically arranged in the dishwasher 200. The processor may control the manipulator for each of the dishes to be disposed at the arrangement position of each of the identified dishes.

In one or more embodiments of the present disclosure, the processor 140 may identify the distance between the robot 100 and the dishwasher 200 on the basis of the sensing information obtained through the sensor of the robot 100. As an example, the processor 140 may identify the distance between the robot 100 and the dishwasher 200 on the basis of the LiDAR sensor, the ToF sensor, or the like. Here, the processor 140 may transmit the signal requesting to open the door of the dishwasher 200 through the communication interface 130 if the distance between the robot 100 and the dishwasher 200 is less than the predetermined distance.

Figure 8:
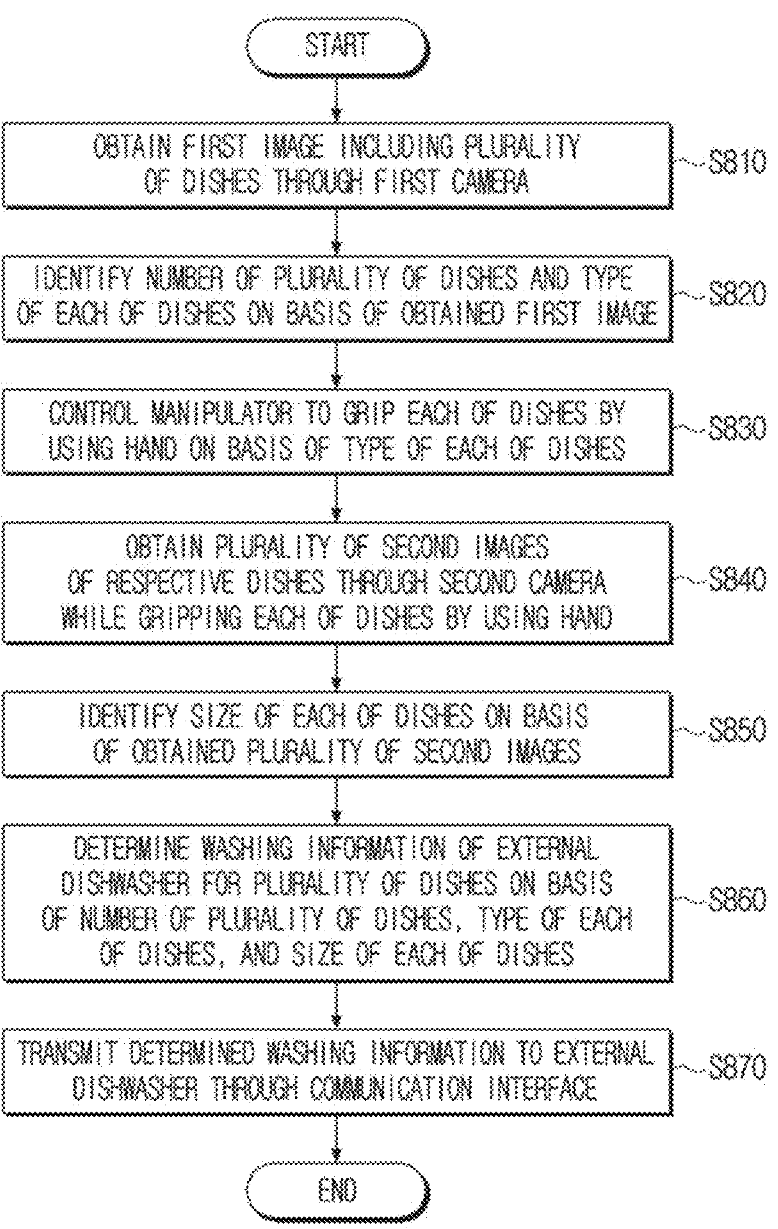
FIG. 8 is a flowchart schematically showing a control method of a robot for obtaining information about the plurality of dishes by using a plurality of cameras according to one or more embodiments of the present disclosure.

FIG. 8 is a flowchart schematically showing a control method of the robot for obtaining the information about the plurality of dishes by using the plurality of cameras 110 according to one or more embodiments of the present disclosure.

Operations S860 and S870 shown in FIG. 8 may correspond to operations S740 and S750 shown in FIG. 7.

Referring to FIG. 8, the processor 140 may obtain the first image 20 including the plurality of dishes 10 through the first camera 111 of the robot (S810).

In addition, the processor 140 may identify the number of the plurality of dishes 10 and the type of each of the dishes on the basis of the obtained first image 20 (S820), and control the manipulator 120 to grip each of the dishes by using the hand 121 on the basis of the type of each of the dishes (S830).

In addition, the processor 140 may obtain the plurality of second images 30 of the respective dishes through the second camera 112 of the robot while gripping each of the dishes by using the hand 121 of the manipulator 120 (S840).

In addition, the processor 140 may identify the size of each of the dishes on the basis of the obtained plurality of second images 30 (S850).

In the description provided above, operations S710 to S750 and S810 to S870 may be further divided into additional operations or combined into fewer operations, according to one or more embodiments of the present disclosure. In addition, some operations may be omitted as needed, and an order between the operations may be changed.

The methods according to one or more embodiments of the present disclosure described above may be implemented in the form of an application capable of being installed in a conventional robot. Alternatively, the methods according to one or more embodiments of the present disclosure described above may be performed using a deep learning-based trained neural network (or deep-learning neural network), that is, the learning network model. In addition, the methods according to one or more embodiments of the present disclosure described above may be implemented only by the software upgrade or hardware upgrade of the conventional robot. In addition, one or more embodiments of the present disclosure described above may be performed through an embedded server disposed in the robot, or a server disposed outside the robot.

According to one or more embodiments of the present disclosure, one or more embodiments described above may be implemented by software including an instruction stored on a machine-readable storage medium (for example, a computer-readable storage medium). A machine may be a device which may invoke the stored instruction from the storage medium, be operated based on the invoked instruction, and include the robot in the disclosed embodiments. If the instruction is executed by the processor, the processor may directly perform a function corresponding to the instruction or another component may perform the function corresponding to the instruction under the control of the processor. The instruction may include codes generated or executed by a compiler or an interpreter. The machine-readable storage medium may be provided in the form of a non-transitory storage medium. Here, the term "non-transitory" indicates that the storage medium is tangible without including a signal, and does not distinguish whether data are semi-permanently or temporarily stored on the storage medium.

In addition, the methods according to one or more embodiments described above may be included and provided in a computer program product. The computer program product may be traded as a product between a seller and a purchaser. The computer program product may be distributed in a form of the machine-readable storage medium (for example, a compact disc read only memory (CD-ROM)) or online through an application store (for example, PlayStore™). In case of the online distribution, at least portions of the computer program product may be at least temporarily stored on a storage medium such as a memory of a server of a manufacturer, a server of an application store or a relay server, or be temporarily provided.

In addition, each of the components (e.g., modules or programs) according to one or more embodiments described above may include one entity or a plurality of entities, and some of the corresponding sub-components described above may be omitted or other sub-components may be further included in one or more embodiments. Alternatively or additionally, some of the components (e.g., modules or programs) may be integrated into one entity, and may perform functions performed by the respective corresponding components before being integrated in the same or similar manner. Operations performed by the modules, the programs, or other components according to one or more embodiments may be executed in a sequential manner, a parallel manner, an iterative manner, or a heuristic manner, at least some of the operations may be performed in a different order or be omitted, or other operations may be added.

Although the embodiments are shown and described in the present disclosure as above, the present disclosure is not limited to the above-described specific embodiments, and may be variously modified by those skilled in the art to which the present disclosure pertains without departing from the gist of the present disclosure as claimed in the accompanying claims. These modifications should also be understood to fall within the scope and spirit of the present disclosure.

What is claimed is:

1. A robot comprising:
at least one camera;
a manipulator comprising a gripper;
a communication interface;
memory storing one or more instructions; and
at least one processor configured to execute the one or more instructions, wherein the one or more instructions, when executed by the at least one processor, cause the robot to:
obtain an image comprising one or more dishes through the at least one camera,
obtain, based on the image, information about a number of the one or more dishes, information about a type of each of the one or more dishes, and information about a size of each of the one or more dishes,
control the manipulator to grip each of the one or more dishes using the gripper based on at least one of the information about the type of each of the one or more dishes or the information about the size of each of the one or more dishes,
determine washing information of an external dishwasher for the one or more dishes based on the information about the number of the one or more dishes, the information about the type of each of the one or more dishes, and the information about the size of each of the one or more dishes, and
transmit the washing information to the external dishwasher through the communication interface.

2. The robot of claim 1,
wherein the at least one camera comprises a first camera and a second camera, and
wherein the one or more instructions, when executed by the at least one processor, cause the robot to:
obtain a first image comprising the one or more dishes through the first camera,
identify the number of the one or more dishes and the type of each of the one or more dishes based on the first image,
control the manipulator to grip each of the one or more dishes using the gripper based on the type of each of the one or more dishes,
obtain one or more second images of the respective one or more dishes through the second camera while gripping each of the one or more dishes using the gripper, and
identify the size of each of the one or more dishes based on the one or more second images.

3. The robot of claim 1, wherein the one or more instructions, when executed by the at least one processor, cause the robot to:

determine an arrangement order of the one or more dishes based on the information about the type of each of the one or more dishes, and control the manipulator to place the one or more dishes in the external dishwasher based on the arrangement order.

4. The robot of claim 3, wherein the one or more instructions, when executed by the at least one processor, cause the robot to, based on the one or more dishes corresponding to a first type, determine the arrangement order of the one or more dishes based on the information about the size of each of the one or more dishes.

5. The robot of claim 4, wherein the one or more instructions, when executed by the at least one processor, cause the robot to:

identify an arrangement position of each of the one or more dishes in the external dishwasher based on the information about the type of each of the one or more dishes and the information about the size of each of the one or more dishes, and control the manipulator to place each of the one or more dishes at the arrangement position of each of the one or more dishes.

6. The robot of claim 1, wherein the one or more instructions, when executed by the at least one processor, cause the robot to:

determine a washing time of the external dishwasher for the one or more dishes based on the information about the number of the one or more dishes, and transmit the washing time as the washing information for the one or more dishes to the external dishwasher through the communication interface.

7. The robot of claim 1, wherein the one or more instructions, when executed by the at least one processor, cause the robot to:

based on the one or more dishes comprising a plurality of dishes and based on the number of the plurality of dishes being greater than or equal to a predetermined number, classify the plurality of dishes into a first wash group and a second wash group based on the information about the type of each of the one or more dishes and the information about the size of each of the one or more dishes, identify a number of dishes in each of the first wash group and the second wash group, and determine a washing order of the first wash group and the second wash group based on the number of dishes in the first wash group and the number of dishes in the second wash group.

8. The robot of claim 1, wherein the one or more instructions, when executed by the at least one processor, cause the robot to:

determine an operation speed of the external dishwasher based on the information about the number of the one or more dishes, and transmit the operation speed as the washing information for the one or more dishes to the external dishwasher through the communication interface.

9. The robot of claim 1, further comprising a sensor, wherein the one or more instructions, when executed by the at least one processor, cause the robot to, based on obtaining sensing information through the sensor indicating that a distance between the robot and the external dishwasher is less than a predetermined distance, transmit, through the communication interface, a signal requesting to open a door of the external dishwasher.

10. A method of controlling a robot, the method comprising:

obtaining an image comprising one or more dishes through at least one camera of the robot;

obtaining, based on the image, information about a number of the one or more dishes, information about a type of each of the one or more dishes, and information about a size of each of the one or more dishes, controlling a manipulator of the robot to grip each of the one or more dishes using a gripper based on at least one of the information about the type of each of the one or more dishes or the information about the size of each of the one or more dishes;

determining washing information of an external dishwasher for the one or more dishes based on the information about the number of the one or more dishes, the information about the type of each of the one or more dishes, and the information about the size of each of the one or more dishes; and transmitting the washing information to the external dishwasher through a communication interface of the robot.

11. The method of claim 10, wherein the obtaining the image comprising obtaining a first image comprising the one or more dishes through a first camera of the robot, and wherein the obtaining the information about the number of the one or more dishes, the information about the type of each of the one or more dishes, and the information about the size of each of the one or more dishes comprises:

identifying the number of the one or more dishes and the type of each of the one or more dishes based on the first image;

controlling the manipulator to grip each of the one or more dishes using the gripper based on the type of each of the one or more dishes;

obtaining one or more second images of the respective one or more dishes through a second camera of the robot while gripping each of the one or more dishes using the gripper; and identifying the size of each of the one or more dishes based on the one or more second images.

12. The method of claim 10, further comprising:

determining an arrangement order of the one or more dishes based on the information about the type of each of the one or more dishes; and controlling the manipulator to place the one or more dishes in the external dishwasher based on the arrangement order.

13. The method of claim 12, wherein the determining the arrangement order comprises, based on the one or more dishes corresponding to a first type, determining the arrangement order of the one or more dishes based on the information about the size of each of the one or more dishes.

14. The method of claim 13, wherein the controlling the manipulator to place the one or more dishes in the external dishwasher further comprises:

identifying an arrangement position of each of the one or more dishes in the external dishwasher based on the information about the type of each of the one or more dishes and the information about the size of each of the one or more dishes, and controlling the manipulator to place each of the one or more dishes at the arrangement position of each of the one or more dishes.

15. The method of claim 10, further comprising:

determining a washing time of the external dishwasher for the one or more dishes based on the information about the number of the one or more dishes; and transmitting the washing time as the washing information for the one or more dishes to the external dishwasher through the communication interface.

16. The method of claim 10, further comprising:

based on the one or more dishes comprising a plurality of dishes and based on the number of the plurality of dishes being greater than or equal to a predetermined number, classifying the plurality of dishes into a first wash group and a second wash group based on the information about the type of each of the one or more dishes and the information about the size of each of the one or more dishes;

identifying a number of dishes in each of the first wash group and the second wash group; and determining a washing order of the first wash group and the second wash group based on the number of dishes in the first wash group and the number of dishes in the second wash group.

17. The method of claim 10, further comprising:

determining an operation speed of the external dishwasher based on the information about the number of the one or more dishes; and transmitting the operation speed as the washing information for the one or more dishes to the external dishwasher through the communication interface.

18. The method of claim 10, further comprising:

based on obtaining sensing information through the robot indicating that a distance between the robot and the external dishwasher is less than a predetermined distance, transmitting, a signal requesting to open a door of the external dishwasher.

19. A non-transitory computer readable medium having instructions stored therein, which when executed by at least one processor cause the at least one processor to execute a method of controlling a robot, the method comprising:

obtaining an image comprising one or more dishes through at least one camera of the robot;

obtaining, based on the image, information about a number of the one or more dishes, information about a type of each of the one or more dishes, and information about a size of each of the one or more dishes, controlling a manipulator of the robot to grip each of the one or more dishes using a gripper of the robot based on at least one of the information about the type of each of the one or more dishes or the information about the size of each of the one or more dishes;

determining washing information of an external dishwasher for the one or more dishes based on the information about the number of the one or more dishes, the information about the type of each of the one or more dishes, and the information about the size of each of the one or more dishes; and transmitting the washing information to the external dishwasher through a communication interface of the robot.

20. The non-transitory computer readable medium of claim 19, wherein the obtaining the image comprising obtaining a first image comprising the one or more dishes through a first camera of the robot, and wherein the obtaining the information about the number of the one or more dishes, the information about the type of each of the one or more dishes, and the information about the size of each of the one or more dishes comprises:

identifying the number of the one or more dishes and the type of each of the one or more dishes based on the first image;

controlling the manipulator to grip each of the one or more dishes using the gripper based on the type of each of the one or more dishes;

obtaining one or more second images of the respective one or more dishes through a second camera of the robot while gripping each of the one or more dishes using the gripper; and identifying the size of each of the one or more dishes based on the one or more second images.

* * * * *